H. L. MENDAL.
COMBINATION COOKING DEVICE.
APPLICATION FILED JAN. 21, 1919.
1,351,921.
Patented Sept. 7, 1920.
2 SHEETS—SHEET 2.
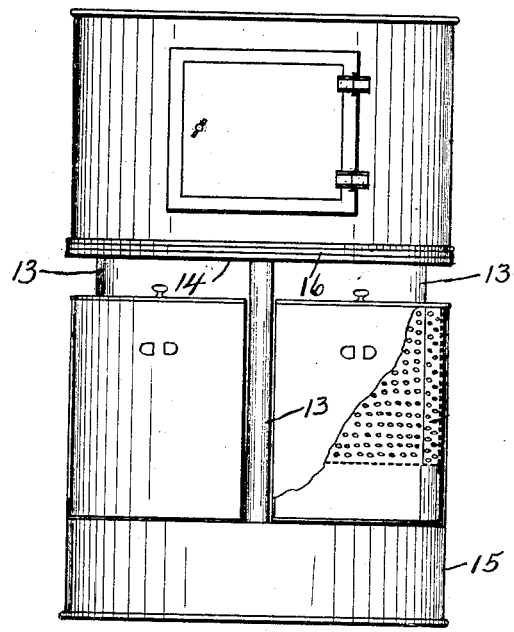
Fig. 4.
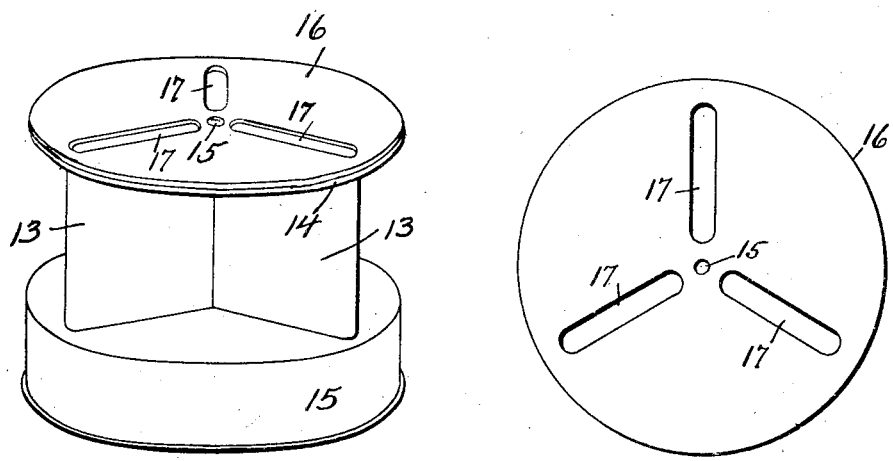
Fig. 5.
Fig. 6.
Inventor:
Henry L. Mendal
By Chafin A Ferguson
Attorney.

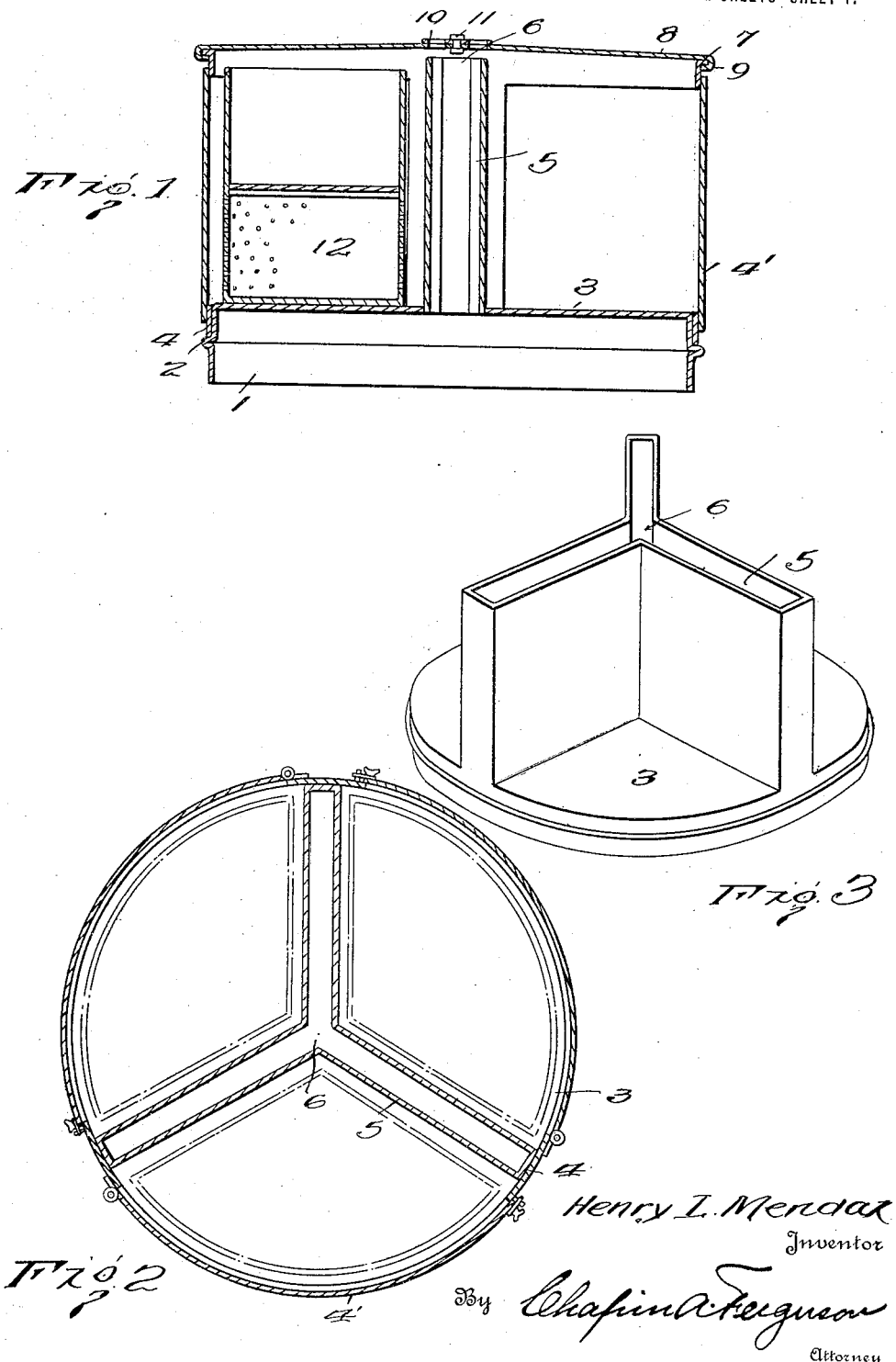

UNITED STATES PATENT OFFICE.

HENRY LLOYD MENDAL, OF BALTIMORE, MARYLAND, ASSIGNOR OF ONE-FOURTH TO KATE M. LANGLEY, OF BALTIMORE, MARYLAND.

COMBINATION COOKING DEVICE.

1,351,921.  Specification of Letters Patent.  Patented Sept. 7, 1920.

Application filed January 21, 1919. Serial No. 272,372.

*To all whom it may concern:*

Be it known that I, HENRY LLOYD MENDAL, a citizen of the United States, residing in Baltimore, State of Maryland, have invented a new and useful Combination Cooking Device, of which the following is a specification.

This invention relates to certain new and useful improvements in combination cooking devices and more particularly to a device of this character that is constructed and provided with means to perform several operations in cooking, all at one time by the use of only one fire space, and thus utilize the heat products which under ordinary circumstances would be wasted. The objects of my invention are:

To provide a series of heat conducting flues between the several cooking utensils, confining the heat within these flues, and forcing the radiation through the walls of the cooking utensil in order to expedite the cooking. Also to save space and the consumption of fuel.

This invention consists of the novel construction and arrangement of the parts and combination of parts hereinafter more fully set forth in the following specification and pointed out in detail in the appended claims.

In the accompanying drawing,—

Figure 1 is a vertical section of my invention showing the cooking utensils in position therein.

Fig. 2 is a longitudinal section.

Fig. 3 is a detail perspective view of the base plate and flues.

Fig. 4 is a side elevation of a modification of my invention showing the cooking utensils in position therein.

Fig. 5 is a detail perspective view of said modification with a cooking receptacle removed.

Fig. 6 is a top plan view of the revolving damper plate shown in said modification.

Referring to the accompanying drawings forming part of this specification and in which like reference numerals designate like parts throughout the several views thereof, 1 designates the base which is cylindrical and adapted to fit over the hole of a stove or over the gas heater of a gas stove and is sufficiently high to permit the use of a lamp or other suitable heater therein. Said base 1 has an annular flange 2 and a top plate 3. The drum 4 has its lower edge resting on the flange 2 and is provided with doors 4' which permit the cooking receptacles to be inserted in said drum to rest on the plate 3. Projecting upwardly from the base 1 is a heat conducting flue comprising a number of radiating branches 5 having an opening 6 leading upwardly from the base 1. The top of the drum 4 is provided with a flange 7 over which the top 8 is crimped at 9, the said top 8 is provided with openings 10 and a damper plate 11 pivoted to said top and having openings adapted to register with the openings 10 in the top of the cover 8.

The cooking utensils which are triangular in shape are placed on the base plate 3 between the heat conducting flues 5. The heat passing up through said flues 5 will be caused to radiate through the walls of said flues to the cooking utensils, the amount of heat to be retained within the drum can be regulated by the damper plate 11 by opening or closing same. Cooking may also be done by placing the cooking utensil on the top 8, or sad irons may be heated by placing same on said top 8.

In Figs. 4, 5, and 6 of the drawing I have shown a modification of my invention in which the flues 13 are connected at the top with the plate 14 leaving openings through from said plate 14 to the base 15. Revolubly secured to the upper plate 14 by means of a pivot 15, is a damper plate 16 having apertures 17 adapted to register with the flues 13.

While I have herein illustrated and described structural details embodying my invention, it is understood that the invention is not limited to the particular form and arrangement of the several parts, which may be modified within the scope of the appended claims without departing from the spirit of my present invention.

Having thus described my invention what I claim is:

1. A combination cooking device comprising a base plate, a heat conducting flue comprising a number of branches diverging from the center and open at each end and affixed to said base plate, a cover above said heat conducting flue, and a revolving plate secured to said cover and provided with open spaces to serve as a damper.

2. A combination cooking device comprising a base plate, a heating chamber extending below said plate, a heat conducting flue diverging from the center of said base plate and extending outwardly to the outer rim of the base plate, said heat conducting flues extending upwardly adjacent to the top plate, said top plate being provided with a revolving damper plate.

3. A combination cooking device comprising a base plate, an air or heat chamber below and affixed to said base plate, a heat conducting flue extending upwardly from said base plate, said heat conducting flue comprising a number of branches diverging from the center of said base plate and being open at each end, and a revolving damper plate connected to said top plate for the purpose shown and described.

4. A combination cooking device comprising a hollow base a flue comprising a number of radiating branches projecting upwardly from the upward surface of said base plate and being open at each end, a drum surrounding said flue and a damper plate revolubly secured at the top of said drum.

5. A combination cooking device comprising a hollow base, a drum resting on said base and forming a heat retaining chamber, a heat conducting flue comprising a number of radiating branches secured to said base and having openings at both ends and terminating adjacent at the top of said heat retaining drum, and a revolving damper secured to the upper surface of the said heat retaining chamber.

HENRY LLOYD MENDAL.

Witnesses:
H. T. DALY,
GEORGE C. SWEETEN.